P. PANOULIAS.
DEVICE FOR USE IN CANDY MAKING.
APPLICATION FILED JUNE 18, 1910.
1,062,661.
Patented May 27, 1913.
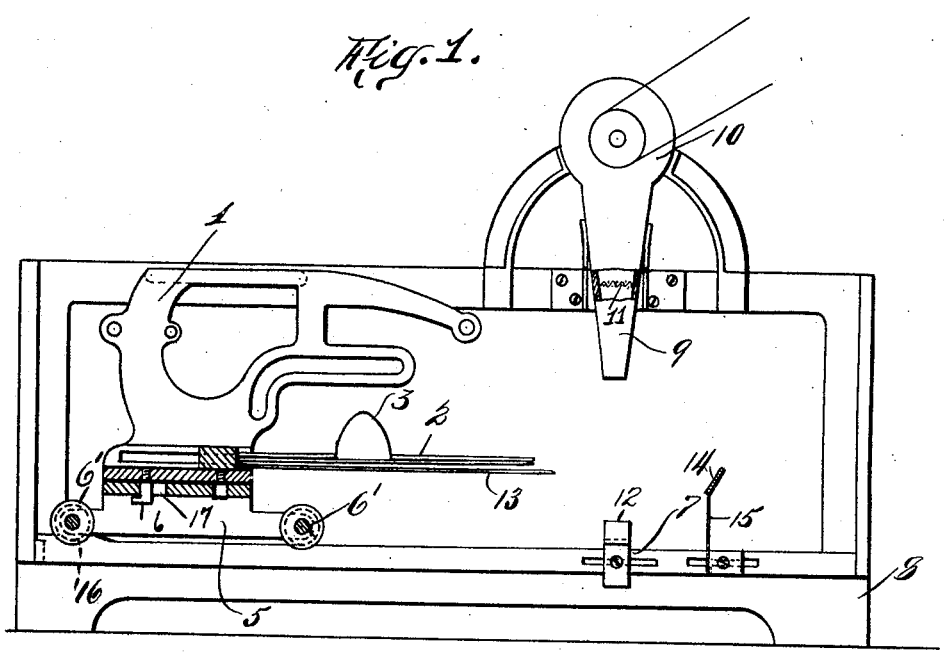
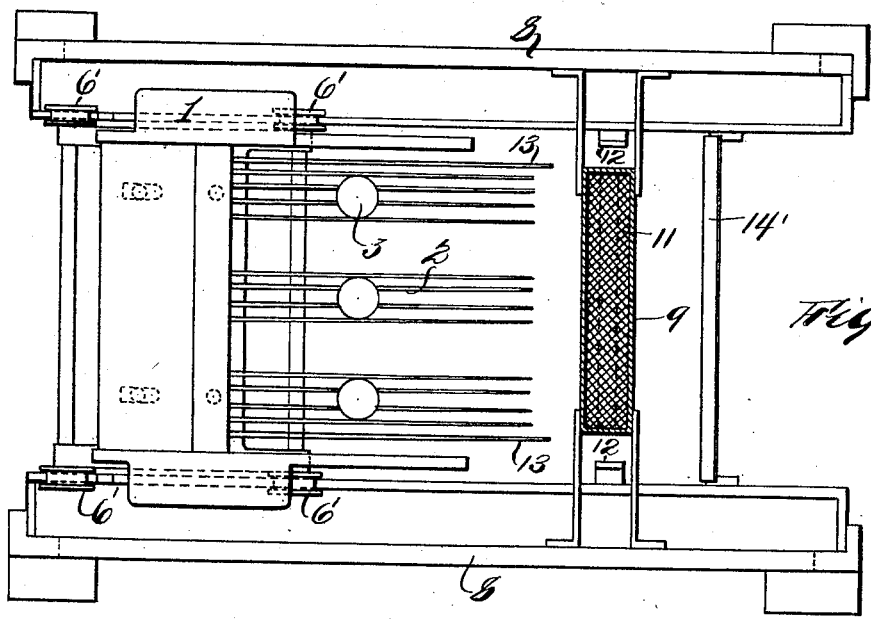
Witnesses:
C. A. Jarvis
F. W. Wright
Inventor.
Panayiotis Panoulias
by Ferdinand E. M. Bullowa
attorney.
COLUMBIA PLANOGRAPH CO., WASHINGTON, D. C.

UNITED STATES PATENT OFFICE.

PANAYIOTIS PANOULIAS, OF HOBOKEN, NEW JERSEY.

DEVICE FOR USE IN CANDY-MAKING.

1,062,661.     Specification of Letters Patent.     Patented May 27, 1913.

Application filed June 18, 1910. Serial No. 567,619.

*To all whom it may concern:*

Be it known that I, PANAYIOTIS PANOULIAS, a subject of the King of Greece, residing at the city of Hoboken and State of New Jersey, have invented certain new and useful Improvements in Devices for Use in Candy-Making, of which the following is a clear, full, and exact description.

The object of this invention is to provide improved devices for smoothing and removing surplus chocolate from chocolate coated candies, and a further object is to prevent drip from the device.

In carrying out my invention, any suitable dipping frame, by which I mean to include any device for holding candy cores when they are coated or actually dipped, may be used, for which I provide a suitable carriage or guide to enable the same to be horizontally moved past the blast from a blower, and returned past the blast so that the surplus chocolate on the candy cores may be removed and a smooth glossy appearance obtained.

In the particular embodiment of my invention shown in this specification, I have shown a dipping frame of that class shown in my United States Patent No. 809,737, which is provided with a row of needles adapted to support the candy cores. These needles, with the candies in place, are dipped or coated, and then the frame which carries the needles placed in position on the traversing carriage, or guide mechanism, and the device horizontally advanced so as to bring the candy beneath the nozzle of a blower that the air from the same may remove the surplus coating. A suitable weight or spring mechanism may be used to retract the carriage that the blower may again act upon the surface.

The scope of my invention will be pointed out in the claims.

As shown in the drawings, Figure 1 is a side elevation of my improved invention, showing the dipping frame in general outline. Fig. 2 is a plan view of Fig. 1.

The dipping or coating frame 1 is of any suitable construction, herein shown as provided with a row of needles 2, on which the candy cores 3 are placed to be coated, either by machine flooding, or as I prefer, by immersing the needles and cores into a bath of chocolate. The sides of the dipping frame 1 are provided with lugs 6, adapted to fit into recesses 17, at the sides of a guide or carriage 5, which may be provided with wheels 6¹, to travel on rails or tracks 7. The rails or tracks 7 are mounted on the frame 8, and above the frame I provide a suitable blower nozzle 9 with its accompanying blower 10 to deliver a draft of air downwardly and across the traversed row of fingers, and the candies placed thereon. The mouth of this nozzle should be so located that the candy core may be passed beneath and be returned under the same, as has been before described.

I prefer to provide a comparatively rigid and firm pin 13 at each end of the row of needles 2 to take the thrust of a flexible and adjustable scraper blade 14 mounted on a flat spring 15 and on the rails or tracks 7, which is adapted to scrape surplus drops of chocolate off the pins 2 and 13. An adjustable stop 12 is preferably provided to limit the forward movement of the carriage 5, secured to the rails or tracks 7. The frame 8 may also have pockets 16 to receive and position the carriage wheels as shown in Fig. 1. A screen or perforated plate 11 may be provided for the blower.

I am aware that it has been proposed heretofore to use blowers to remove the surplus coating from candies, and I do not claim such device broadly.

What I do claim, and desire to protect by United States Letters Patent is:

1. In an apparatus for treating and delivering coated candies, a frame and a blower mounted therein, a coating support, a carriage on said frame adapted to be reciprocated toward and backwarly away from the blower, and means for removably supporting the coating support on said carriage, in combination with scraping means in the path of reciprocation of the support adapted to be contacted thereby.

2. In an apparatus for treating and delivering coated candies, a frame, rails thereon, a blower mounted above the rails, a wheeled carriage on the rails, a removably attached coating support, needles therefor on which the candies rest, a scraping blade arranged in the path of travel of the needles.

Signed at Hoboken, N. J., this 9th day of June, 1910.

PANAYIOTIS PANOULIAS.

Witnesses:
ALEX. ELIADER,
MAY MILLER.

Copies of this patent may be obtained for five cents each, by addressing the "Commissioner of Patents, Washington, D. C."